(12) United States Patent
Laurent (10) Patent No.: US 8,023,596 B2
(45) Date of Patent: Sep. 20, 2011

(54) DOPPLER TRACKING METHOD AND DEVICE FOR A WIDE BAND MODEM

(75) Inventor: Pierre-André Laurent, Bessancourt (FR)

(73) Assignee: Thales (FR)

( * ) Notice: Subject to any disclaimer, the term of this patent is extended or adjusted under 35 U.S.C. 154(b) by 614 days.

(21) Appl. No.: 12/094,983

(22) PCT Filed: Nov. 24, 2006

(86) PCT No.: PCT/EP2006/068898
§ 371 (c)(1),
(2), (4) Date: Oct. 31, 2008

(87) PCT Pub. No.: WO2007/060223
PCT Pub. Date: May 31, 2007

(65) Prior Publication Data
US 2009/0067562 A1    Mar. 12, 2009

(30) Foreign Application Priority Data
Nov. 25, 2005  (FR) ..................................... 05 11968

(51) Int. Cl.
*H04L 27/00* (2006.01)
*H04L 7/00* (2006.01)
*H04L 27/06* (2006.01)

(52) U.S. Cl. .......................... 375/344; 375/324; 375/371

(58) Field of Classification Search ................. 375/324, 375/326, 340, 344, 285, 343, 316, 218, 350, 375/E1.019, E1.022, E1.031, 207, E7.043, 375/E7.044, E7.045, E7.193; 455/182.1, 455/182.2, 192, 1, 192.2; 342/17, 25 D, 342/368, 25 A, 25 R, 160; 73/368; 381/320, 381/312, 321; 367/90, 100, 101, 306, 99
See application file for complete search history.

(56) References Cited

U.S. PATENT DOCUMENTS

| 3,810,019 A | 5/1974 | Miller |
| 4,112,430 A * | 9/1978 | Ladstatter ..................... 342/368 |
| 4,905,211 A | 2/1990 | Mackelburg et al. |
| 7,561,709 B2 * | 7/2009 | Vandali et al. ................ 381/320 |
| 2001/0055352 A1 | 12/2001 | Bannasch et al. |
| 2005/0111588 A1 * | 5/2005 | Green .......................... 375/324 |

* cited by examiner

FOREIGN PATENT DOCUMENTS

WO    2005055442 A2    6/2005

*Primary Examiner* — Dac Ha
*Assistant Examiner* — Wednel Cadeau
(74) *Attorney, Agent, or Firm* — Lowe Hauptman Ham & Berner, LLP (57) ABSTRACT

A system and method for estimating and tracking the frequency offset for a transmission system whose bandwidth is not insignificant with respect to the central frequency, the system transmitting a waveform including fixed carriers whose level is substantially greater than that of the carriers transporting the information, the carriers having frequencies $F_0 \ldots F_{N-1}$, and the useful signal carrying the information. The system has N banks (100) of band-pass filters with, each bank having P filters, suitable for covering all of the values that the frequencies $F_0 \ldots F_{N-1}$ may take after Doppler offset. A filter output is connected to a quadratic envelope detector. P adders (200) are suitable for adding the corresponding outputs of the N banks of filters. A system (300) detects the position of the two largest maxima from the P sums and validates the position of the largest maximum. A system (400) stores the positions of the two largest maxima and their "weight" and for predicting the current value. A system (500) validates/replaces the position found. A system (600) converts the positions into estimated Doppler and filters the latter through a low-pass filter.

6 Claims, 5 Drawing Sheets

DOPPLER TRACKING METHOD AND DEVICE FOR A WIDE BAND MODEM

CROSS-REFERENCE TO RELATED APPLICATIONS

The present Application is based on International Application No. PCT/EP2006/068898, filed on Nov. 24, 2006, which in turn corresponds to French Application No. 05 11968 filed on Nov. 25, 2005, and priority is hereby claimed under 35 USC §119 based on these applications. Each of these applications are hereby incorporated by reference in their entirety into the present application.

FIELD OF THE INVENTION

The invention relates to a method and device allowing Doppler tracking for a broadband modem. More generally, it also relates to a system for estimating and tracking the frequency offset for a transmission system whose bandwidth is not "insignificant" with respect to the central frequency.

DESCRIPTION OF THE PRIOR ART

The problem posed is the transmission of data of any type between two correspondents submerged in the water and at a rate of several hundred bits per second while using a band-pass as small as possible and a computing power that is reduced to the minimum, in particular for standalone equipment running on batteries.

The problem is also that of transmitting data between two correspondents submerged in a given environment.

The electromagnetic waves conventionally used (from a few hundred kHz to several GHz being propagated extremely poorly in the water, the modem (modulator-demodulator) therefore uses acoustic waves to transport the messages transmitted.

For information, the submarine environment has an extremely complex behavior for acoustic waves. Because of its inhomogeneities (salinity, temperature, currents, etc.) mean that the path followed by the waves is in a straight line only for a very short distance and this route varies over time.

The waves that arrive at the receiver may follow several routes with very different delays. These routes may be either "direct" (several different journeys converging on the receiver), or "indirect" (reflections on the surface of the water, possibly disturbed by waves, and on the bottom which may have all kinds of types of relief).

In practice, this results in the arrival at the receiver of many repetitions of the emitted signal, each having, at a given moment, its own amplitude, phase, delay and frequency offset.

To this must be added, where necessary, a frequency offset due to the relative radial speed of the correspondents (Doppler effect) and a pseudo-periodic frequency offset due to the swell if at least one of the correspondents is on the surface.

In some cases, the reliability of the transmission must be virtually perfect. If it is a text, it is possible to tolerate several isolated errors, because they will be automatically corrected by the reader. When it is a binary file (for example a JPEG image), the required error rate is approximately 0, otherwise the image will be very greatly degraded.

In addition, the system is "broadband". In practical applications, the bandwidth of the signal transmitted is not inconsiderable compared with the central transmission frequency.

The Doppler offset being proportional to the frequency, the low frequencies have a lower frequency offset than the high frequencies.

What is more, since the relative speed of the transmitter and of the receiver is not always negligible compared with the speed of sound in water (approximately 1500 m/s), an effect of expansion or contraction of time is observed depending on the sign of the relative speed.

For example, a message transmitted over a period of 10 s will be received in 10.13 seconds if the speed of separation is +10 m/s (36 km/h or approximately 20 knots) which poses problems of synchronization tracking.

To the knowledge of the applicant, there are systems of the "spread spectrum" type in which the payload rate is very low compared with the bandwidth used and in which discretion is appropriate, which prohibits the use of fixed carriers that are easily identifiable.

Patent application WO 2005/055442 discloses a "broadband" system that estimates only once and for the whole duration of the message a Doppler offset value without carrying out tracking.

SUMMARY OF THE INVENTION

The subject of the present invention relates notably to a method making it possible to continuously estimate the frequency offset (Doppler) for a modem operating in a submarine environment.

The invention relates notably to a system of estimating and tracking the frequency offset for a transmission system whose bandwidth is not insignificant with respect to the central frequency, the system emitting a waveform including fixed carriers whose level is substantially greater than that of the carriers transporting the information, the carriers having frequencies $F_0 \ldots F_{N-1}$, and the payload signal carrying the information, characterized in that it comprises at least the following elements:

N banks of band-pass filters, each bank comprising P filters, suitable for covering all of the values that the frequencies $F_0 \ldots F_{N-1}$ may take after Doppler offset, A filter output is connected to a quadratic envelope detector, P adders suitable for adding the corresponding outputs of the N banks of filters, A system for detecting the position of the two largest maxima from the P sums and for validating the position of the largest maximum, A system for storing the positions of the two largest maxima and their "weight" and for predicting the current value, A system for validating/replacing the position found, A system converting the positions into estimated Doppler and filtering the latter through a low-pass filter.

The invention also relates to a method making it possible to estimate and track the Doppler effect for a signal consisting of a waveform including fixed carriers of a level substantially greater than the level of the carriers transporting the information, the carriers having frequencies $F_0 \ldots F_{N-1}$, and the payload signal carrying the information in a transmission system whose bandwidth is not insignificant with respect to the central frequency, characterized in that it comprises at least the following steps:

1. Transmitting the composite signal comprising the payload signal carrying information and the reference signal to a filtering step using the frequencies of the carriers,
2. Determining, for each filter, the envelope of the signal, $e_{n,p}$, 3. Adding the various outputs $e_{n,p}$,
4. Determining the values of the two largest maxima, M and m, for several moments, t,
5. Determining the probable value of the position at the moment t, considering the maxima found that define uniquely the associated Doppler offset value,
6. Carrying out a low-pass filtering on the Doppler offset values in order to obtain a smoothed value.

The method comprises for example a step in which the smoothed value is interpolated at intermediate moments by means of low-pass filters derived from the filter defined above.

The filtering step 1 comprises, for example, at least the following steps:
The input signal is windowed by a Hanning window (simple raised cosine) for a period of 160 ms, with overlap of 80 ms between two successive windows,
to the 1.024 points obtained, 3.072 null points are added, then:
the 4096-point fast Fourier transform FFT is carried out on this signal whose output is marked $Z_0, Z_1 \ldots Z_{4095}$,
for a desired central frequency $F_{n,p}$ the rank n of the "bin" $Z_n$ of the fast Fourier transform FFT that is just below is computed,
the actual number x lying between 0 and 1 which is $(F_{n,p} - 1.5625 n)/1.5625$ is computed and two complex numbers $z0(x)$ and $z1(x)$ that are functions of x are selected,
the filter output is determined by $z0(x) Zn+z1(x) Zn+1$.

The method and the system according to the invention notably have the following advantages. They make it possible to carry out submarine communications of long duration, with variable Doppler, between a transmitter and a receiver traveling on any trajectories.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and by limitation, in the figures of the accompanying drawings, wherein elements having the same reference numeral designations represent like elements throughout and wherein.

DESCRIPTION OF THE PREFERRED EMBODIMENTS

In order to better explain the principle used in the invention, the following example is given for a modem operating in a submarine environment, characterized by a considerable and rapidly variable time spread and a not inconsiderable bandwidth with respect to the bandwidth which makes the frequency offset due to the Doppler effect variable in the very bandwidth of the signal ("broadband" effect).

The waveform emitted by the modem in question includes fixed carriers (unmodulated) whose level is substantially greater than that of the carriers transporting the information. It is based on these carriers that the estimate of the average Doppler offset of the signal is made, an offset that is capable of varying rapidly.

The reference carriers are equal to N in number and have frequencies marked $F_0, F_1, \ldots F_{N-1}$.

The maximum Doppler offset is given by a dimensionless number, marked $\delta$, obtained by the equation:

$$\delta = \frac{v_r(R) - v_r(E)}{C - v_r(R)}$$

C: speed of sound in the water
$V_r(E)$: radial speed of the transmitter
$V_r(R)$: radial speed of the receiver
Frame of reference: water, considered to be immobile In the presence of such a Doppler offset, each frequency carrier $F_i$ sees its frequency modified to $(1+\delta) F_i$.

Figure 1:
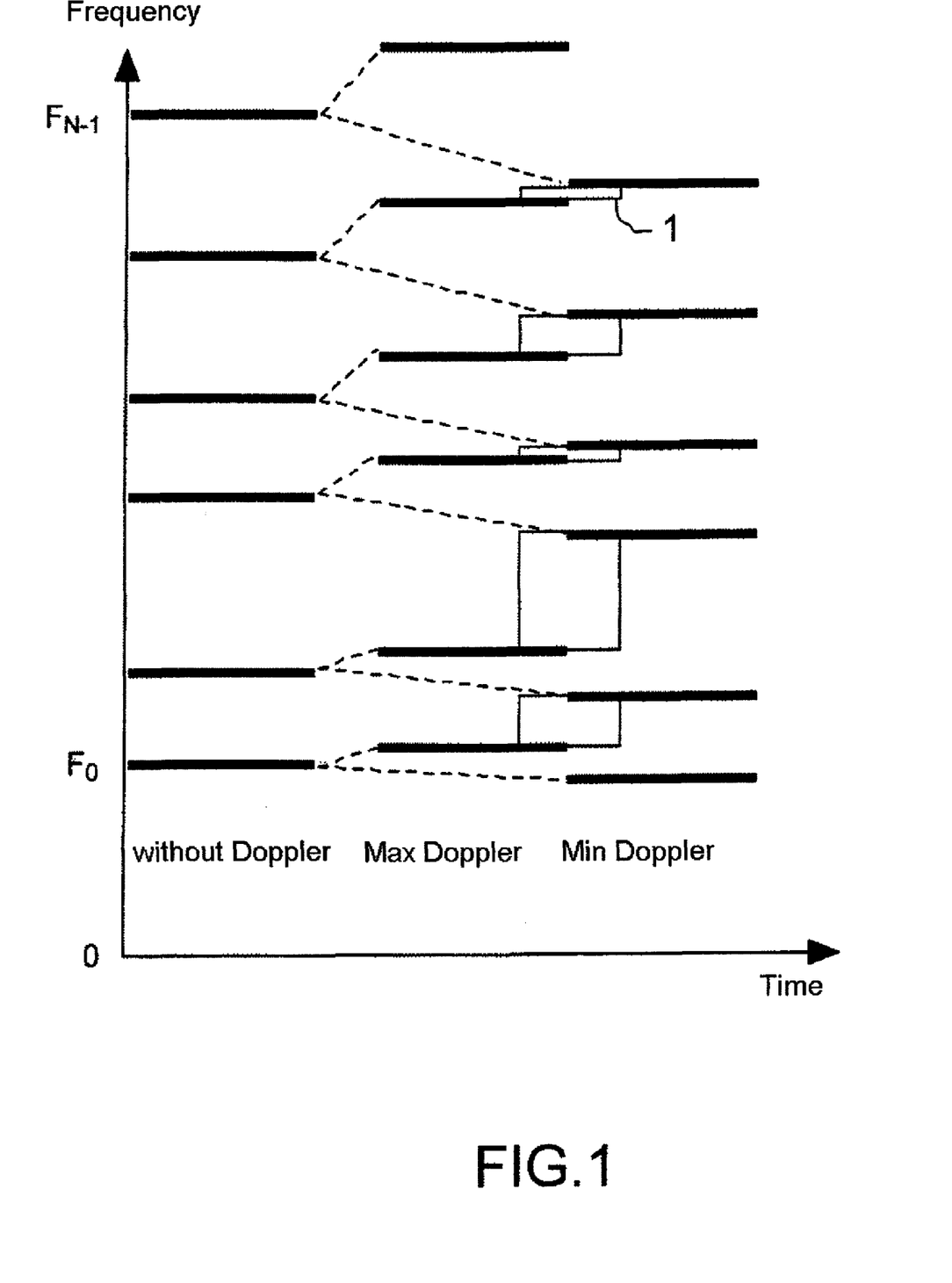
FIG. 1 shows, in a time-frequency space, the effect of the offset on the carriers.

FIG. 1 describes in a time-frequency space the effect of the Doppler offset on the carriers, for $\delta=-\delta_{max}$, $d=0$, and $d=+\delta_{max}$, $\delta_{max}$ being a design element of the system.

Figure 2:
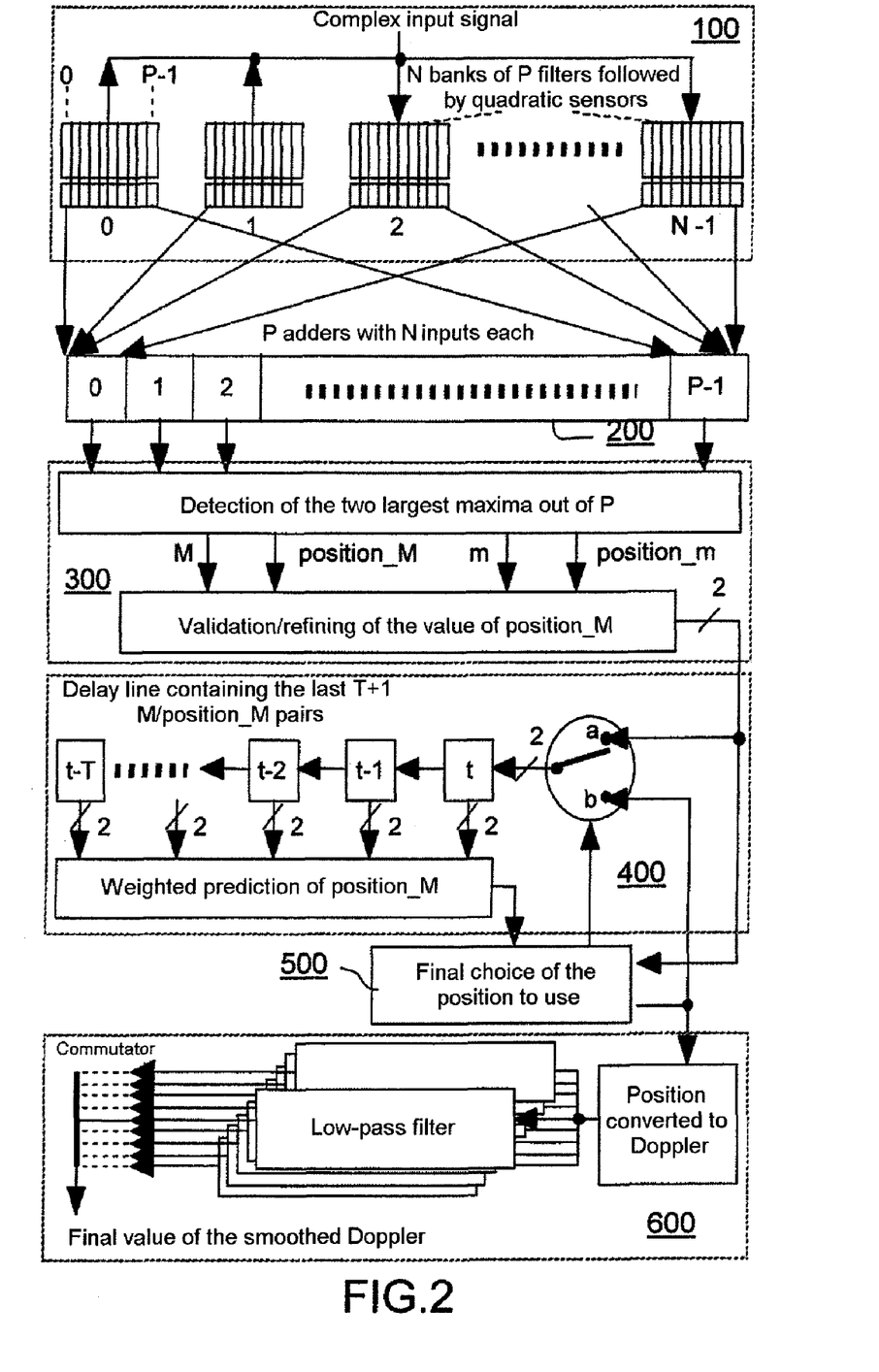
FIG. 2 shows a typical structure of the modules and steps used by the system according to the invention.

Any frequencies may be chosen, but, for $\delta$ to be able to be estimated unambiguously, the small rectangles 1 of FIG. 1 have a positive height, which results in the following simple condition:

$(1-\delta_{max})F_n>(1+\delta_{max})F_{n-1}$ ou $F_n-F_{n-1}>\delta_{max}(F_n+F_{n-1})$ $n=1 \ldots N-1$ FIG. 2 represents the various steps used in the invention and the elements constituting the device.

This system requires the presence, throughout the whole message and even a little longer, of a set of N unmodulated fixed carriers in addition to the payload signal.

The complex signal (reference carriers and useful signal) is received on a processing subsystem comprising, in this order:
a set, 100, of N banks of P band-pass filters covering (slightly more than) at least all of the values that the frequencies $F_0 \ldots F_{N-1}$ that can be taken after Doppler offset.
Each band-pass filter is followed by a quadratic envelope sensor not shown separately from the filters in the figure for reasons of simplification.
a set, 200, of P adders adding the outputs of the quadratic envelope sensors of the same rank for each filter,
a system, 300, for detecting the position of the two largest maxima from the P sums and for validating their positions at the output of the series of adders,
a system, 400, for storing the positions and their "weights" and for predicting the current value,
a system, 500, for validating/replacing the position found,
a system, 600, converting the positions into estimated Doppler and filtering the latter through a low-pass filter which gives an estimate of the Doppler offset (with a fixed delay).

The estimation and tracking mechanism may also include an interpolation mechanism making it possible to have Doppler offset samples more frequently.

The detail of the various elements forming part of the system according to the invention is given below.

Banks of Filters 100

A bank of filters is suitable notably for covering the frequencies lying between $(1-\delta_{max})F_n$ and $(1+\delta_{max})F_n$ where $F_n$ is the frequency after Doppler offset for the bank of filters of rank n.

Each bank of filters comprises, for example, the same number P of band-pass filters of evenly spaced central frequencies.

The $p^{th}$ filter of the $n^{th}$ bank will be centered on a frequency equal to:

$$F_{n,p} = F_n\left(1 + \delta_{max}\left(\frac{2p - P + 1}{P}\right)\right)$$

$$n = 0 \ldots N - 1$$

$$p = 0 \ldots P - 1$$

$F_n$: the frequency after Doppler offset for the bank of filters of rank n.

A simple way of producing the bank of filters is described below.

As an example, it is assumed that the carriers are spaced at multiples of 25 Hz and that the sampling frequency is 6.400 Hz.

It is assumed that, during the demodulation phase, a new symbol appears every 80 ms and then a new frequency offset value is needed.

Assuming that the differential phase demodulation may have up to four phase states, that is at least 90°, if the error of estimation of the frequency offset is dF, the additional phase rotation that it introduces is 360°×80 ms×dF.

So that it does not exceed a quarter of the minimum rotation (empirical rule from experience), the error of estimation of the frequency offset dF must be at most $df_{MAX}$=0.78125 Hz (in absolute value), which means that the fast Fourier transform, FFT, to be used must be able to separate two frequencies separated by 2 $df_{MAX}$=1.5625 Hz. Its number of points must therefore be at least 6.400/1.5625=4.096.

Figure 3:
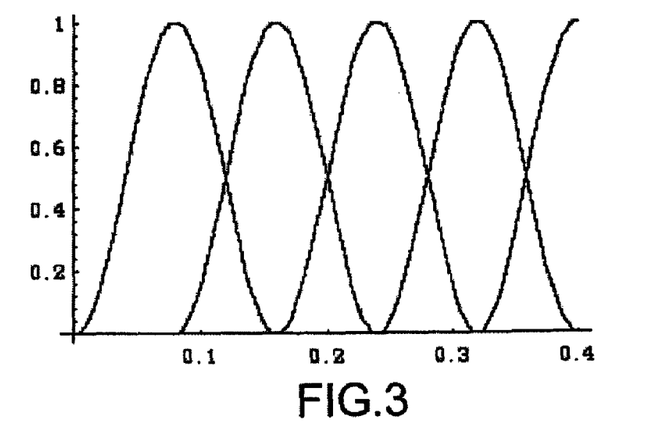
FIG. 3 shows a step for filtering the signal by windowing the input signal.

For this, the process is as follows:

The input signal is windowed (weighting) by a Hanning window (simple raised cosine) for a period of 160 ms, with overlap of 80 ms between two successive windows. This step is illustrated in FIG. 3.

added to the 0.16×6.400=1.024 points obtained are 4.096−1.024=3.072 null points, then:

1. the 4096-point fast Fourier transform FFT is carried out on this signal whose output is marked $Z_0, Z_1 \ldots Z_{4095}$,
2. for a desired central frequency $F_{n,p}$, a computation is made of the rank n of the "bin" $Z_n$ of the Fourier transform FFT that is just below, that is to say that for which $F_n$ lies between n times 1.5625 Hz and (n+1) times 1.5625 Hz,
3. the real number x lying between 0 and 1 is computed which is $(F_{n,p}-1.5625\ n)/1.5625$ and two complex numbers z0(x) and z1(x) that are functions of x (and computed in advance for convenience) are selected,
4. the output of the filter is simply given by z0(x) Zn+z1(x) Zn+1.

The coefficients z0 and z1 are optimized so that the result is as close as possible to the one that a filter really centered on $F_{n,p}$ would give.

One of the two coefficients z0 or z1 may be chosen to be REAL (and the other corrected as a consequence) since the phase of the output signal is of no importance.

Each filter is followed by a quadratic envelope detector giving the square of the modulus of its output (the process is usually carried out on a complex signal, in baseband, i.e. centered on the frequency 0).

The output of the $p^{th}$ detector of the $n^{th}$ bank will be marked $e_{n,p}$.

Figure 4:
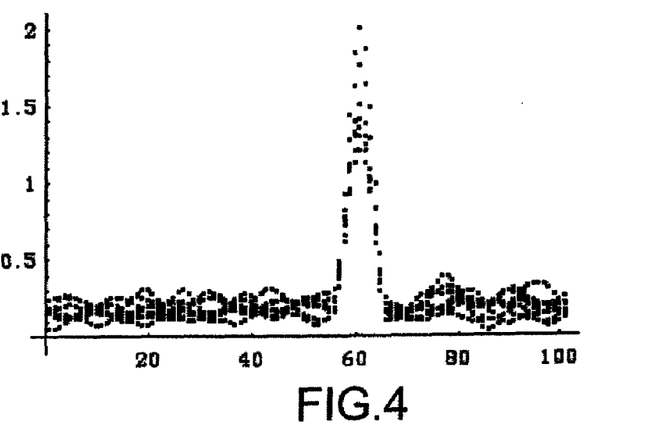
FIG. 4 shows an example of outputs of the sensors.

FIG. 4 gives an example of outputs of the quadratic envelope sensors, for P=100, and N=7 frequencies, with an input signal offset toward the high frequencies.

Adders 200

The output of the $p^{th}$ adder is given by:

$$Sp = \sum_{n=0}^{N-1} e_{n,p}$$

$$p = 0 \ldots P - 1$$

where $e_{n,p}$ is the output of the $p^{th}$ sensor of the $n^{th}$ bank of filters.

Figure 5:
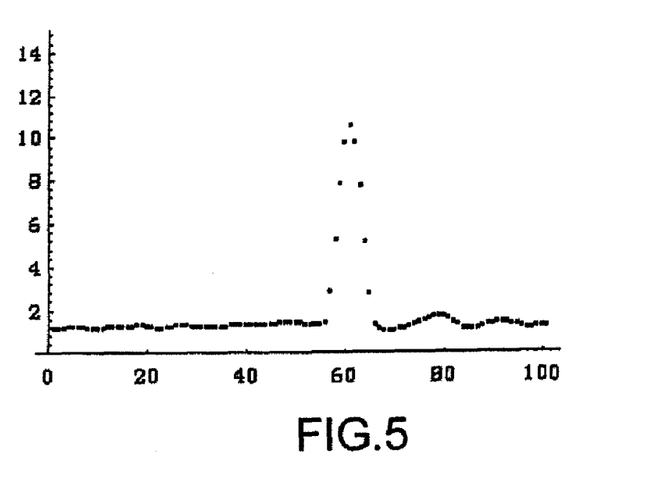
FIG. 5 shows an example of the outputs of the adders.

FIG. 5 represents an example of the outputs of the adders for the case represented by FIG. 4, where the smoothing effect provided by the adding (due to the propagation, the gain may vary a great deal in the vicinity of each of the N carriers) is clearly seen.

Detection of the Two Largest Maxima Out of P 300

The signal originating from the adders 200 is transmitted to a maxima detection system 300 having notably the role of finding two maxima.

Specifically, if there are two maxima of adjacent amplitudes, they are usually of low amplitude and correspond to nothing precise: there is probably only noise at the input of the receiver.

To find these two maxima, M (the largest) and m (the second largest), the method may use the following algorithm, written in simplified C language.

```
/* Initialization */
    M = 0
    position_M = 0
    m = 0
    position_m = 0
        /* Loop to find a maximum in positions 1 ... P-2 */
for( i = 1 to P - 2 ) {
    if (S(i) >= S(i - 1) and S(i) >= S(i + 1) ) {
        /* S(i) is a local maximum */
        if ( S(i) > M ) {
            /* S(i) is the new largest maximum */
            m = M
            position_m = position_M
            M = S(i)
            position_M = i
        } else {
            if ( S(i) > m ) {
                /* S(i) is the second new maximum */
                m = S(i)
                position_m = i
            }
        }
    }
}
```

If position_M is not null (0 is an illegal value) and if m is less than a given proportion of M (for example 50%), M and its position (position_M) may be considered valid. Two maxima have been found.

Otherwise they are ignored subsequently (it is sufficient to put M at zero).

The value of the position of the two maxima is then refined for example by quadratic regression, that is to say that the amplitudes of the sums adjacent to the maximal sum M are approximated by a parabola using three or four neighbors depending on the number of neighbors available, a value indicated subsequently as the corrected value.

For the drafting of the search algorithm, any language other than C language may be used.

Figure 6:
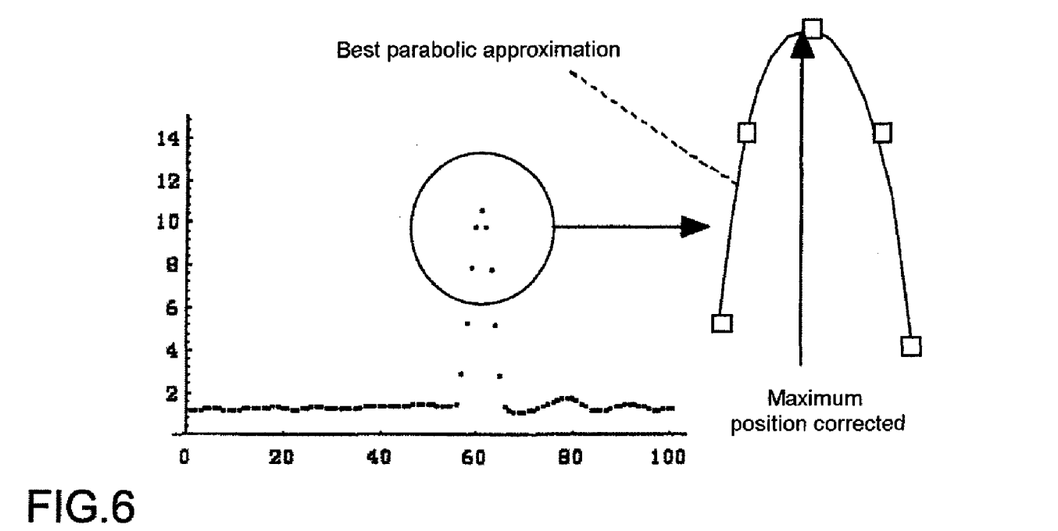
FIG. 6, shows an example of parabolic regression.

FIG. 6 gives an example of parabolic regression, still on the same data of FIGS. 4 and 5.

The position of the maximum of the parabola is the modified value of position_M which, an integer, becomes a real number.

For position_M=1, the correction is equal to:

$$\frac{11S_0 - 3S_1 - 7S_2 - S_3}{10(S_0 - S_1 - S_2 + S_3)}$$

For position_M=2 . . . P−3, the correction is equal to:

$$\frac{7(2S_{p-2} + S_{p-1} + S_{p+1} - 2S_{p+2})}{10(2S_{p-2} - S_{p-1} - 2S_p - S_{p+1} + 2S_{p+2})}$$

For position_M=P−2 the correction is equal to:

$$\frac{(S_{p-4} + 7S_{p-3} + 3S_{p-2} - 11S_{p-1})}{10(S_{p-4} - S_{p-3} - S_{p-2} + S_{p-1})}$$

At the output of the maxima detector, the user has two values of maxima and their position.

Position Predictor 400

The prediction/replacement system 400 uses the value of the position corrected at the moment t, and at the moments t−1, t−2, . . . , t−T (t being taken to be an integer for the convenience of the computations and at least equal to 4). The value of the corrected position corresponds to the value of the position deducted from the maxima and refined by quadratic regression.

Its function is notably to evaluate, based on the past, the probable value of the position at the moment t, first considering the maxima of largest amplitude ($M_{t-1}, M_{t-2}, \ldots, M_{t-T}$), because they are the smallest. It is constituted notably of a delay line containing the last T+1 M/position_M pairs.

Since, over a limited period, the Doppler variation may be assimilated locally to a parabola, the value of the position at the moment t is predicted by means of a weighted quadratic regression.

For this, the coefficients a, b, c of a parabola are computed minimizing the following weighted quadratic error (in which the variable $pos_t$ indicates the value of position_M after correction):

$$E = \sum_{i=t-T}^{t} Mi((ai^2 + bi + c) - pos_i)^2$$

The predicted value is simply $\widehat{pos}_t = at^2 + bt + c$

Its computation is simple and given by the following series of equations:

$$U_k = \sum_{i=t-T}^{t} M_i(t-i)^k, k = 0 \ldots 4$$

$$W_k = \sum_{i=t-T}^{t} M_i pos_i(t-i)^k, k = 0 \ldots 2$$

$$\widehat{pos}_t = \frac{W_0(U_2U_4 - U_3^2) + W_1(U_2U_3 - U_1U_4) + W_2(U_1U_3 - U_2^2))}{U_0(U_2U_4 - U_3^2) + U_1(U_2U_3 - U_1U_4) + U_2(U_1U_3 - U_2^2)}$$

Choice of the Position to Use, 500

The value predicted for the position is transmitted to a device 500 of final choice of the position to be used. This latter also receives the information originating from the step for validating/refining the position value.

If the corrected position is not valid, the computation is made with $M_t=0$, and the predicted value ($pos_t$) is replaced by its value estimated by means of the formula given above and $M_t$ by the average of the preceding values.

If the corrected position is valid, its value estimated with the measured value of $M_t$ is computed. If the difference between the estimated position and the corrected position is sufficiently small (in absolute value), the value of $pos_t$ is retained; otherwise, the procedure is as explained above.

This mechanism makes it possible to eliminate the aberrant values.

Initialization is carried out with T+1 values $M_i$ equal and small and values $pos_t$ corresponding to a null frequency offset, that is (P−1)/2.

The approximation of the Doppler variation by a sinusoid would perhaps be more appropriate to the submarine acoustic channel (because of the periodic character of the swell). The computations are however more complex.

The conversion of the position to "Doppler" can be carried out after the correction of the position, simply by replacing $pos_t$ with:

$$\delta_i = \delta_{max}\left(\frac{2pos_i - P + 1}{P}\right)$$

The computations will be the same, simply replacing $pos_i$ with $\delta_i$.

Final Filtering, 600

This module receives the value originating from the conversion of the position to Doppler. It comprises for example several low-pass filters and a commutator.

The last step of the process consists in carrying out a low-pass filtering consequent on the values of the Doppler offsets in order to obtain as faithful as possible a smoothed value δ while the instantaneous frequency of δ remains lying between two frequencies $-F_0$ and $+F_0$.

For example, a linear-phase low-pass filter will be used with an odd number of coefficients, namely:

$$\delta = \sum_{i=t-2K}^{i=t} h_{t-i}\delta_i \text{ where}$$

$$\sum_{i=0}^{i=2K} h_i = 1 \text{ and} \quad (1)$$

$$h_i = h_{2K-i}, i = 0 \ldots K-1 \quad (2)$$

The condition (1) guarantees that a constant offset at the input will be unchanged at the output.
The condition (2) expresses the linear phase, which guarantees a constant delay irrespective of the instantaneous speed of variation of $\delta$. This delay is equal to K times the sampling period. The delay due to the foregoing processes must be added to this, notably the filtering step for which all the N×P filters must have the same delay, which is the case with the exemplary embodiment proposed.

For the exact design of the filter, which must be as "flat" as possible between $-F_0$ and $+F_0$, it is possible to use the following method:
1—obtain an ideal filter whose frequency response is given by:

$$h(f) = 1 + \alpha\left(\frac{f}{F_0}\right)^2$$

$$-F_0 <= f <= +F_0$$

Figure 7:
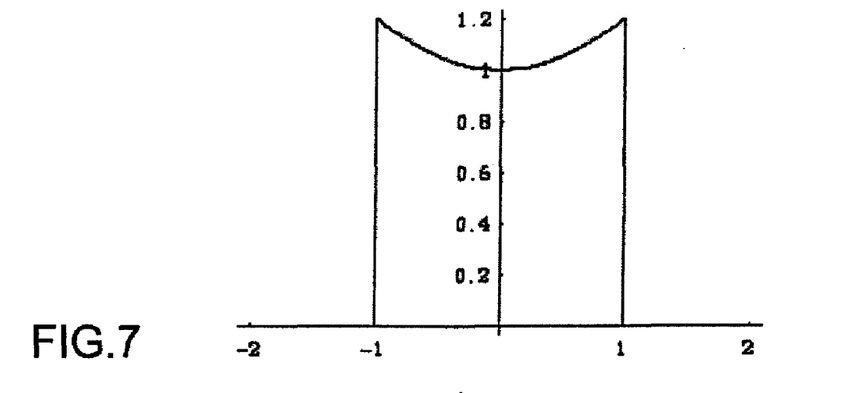
FIGS. 7 to 9 show the results of the final filtering.
Figure 8:
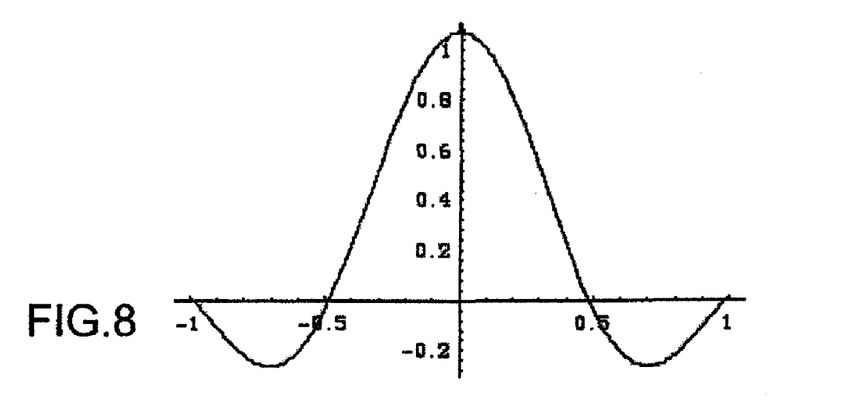

0 elsewhere an example is given in FIG. 7 for $F_0=1$ Hz and $\alpha=0.2$.
2—calculate its impulse response (modified to be 1 for t=0)

$$\theta = 2\pi F_0 t$$

$$h(t) = 3\frac{2\alpha\theta\cos(\theta) + (\theta^2(1+\alpha) - 2\alpha)\sin(\theta)}{(3+\alpha)\theta^3} \text{ (where: } h(0) = 1\text{)}$$

given by:
an example of impulse response is given in FIG. 8.
3—compute its impulse response sampled at intervals equal to T, and weight it by a Hamming window, for example:

$$h_i = h((i-K)T)\left(0.54 + 0.46\cos\left(\pi\frac{i-K}{K+0.5}\right)\right)$$

$$i = 0 \ldots 2K$$

Figure 9:
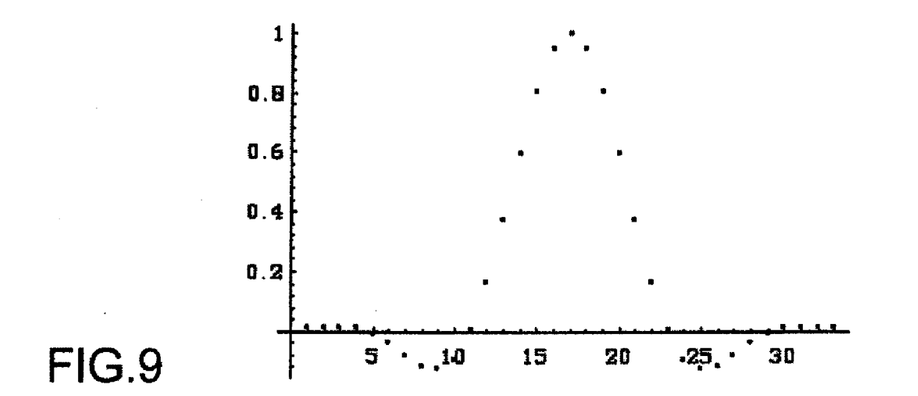
Figure 10:
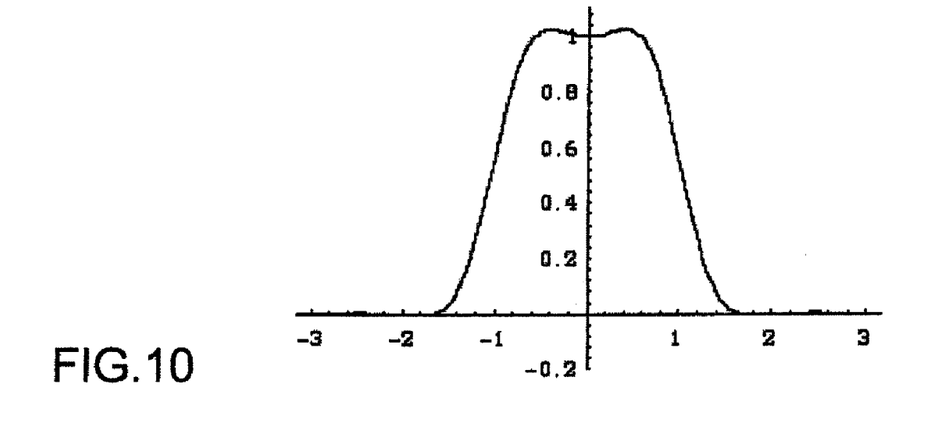
FIG. 10 shows an example of a frequency response obtained.

For T=80 ms, and K=16, for example, a response is represented in FIG. 9.
4—adjust the coefficient $\alpha$ to have a frequency response as flat as possible in the band,
5—normalize so that the sum of the coefficients is 1.
FIG. 10 represents an example of frequency response obtained (the value of $\alpha$ is intentionally a little too high).
If it is desired to have Doppler values at a more rapid rate than every 80 ms, a technique of interpolation should be used to obtain the intermediate values.

The technique well known to those skilled in the art and called "polyphase filters" makes it possible to obtain the intermediate samples.

In an exemplary embodiment, the coefficients $h'_i$ of a filter giving samples offset in time can be calculated simply by the following generic formula:

$$h'_p = \frac{(-1)^{p+1}\sin(\pi\theta)}{\pi}\left(\frac{h_0}{p-\theta} + \sum_{i=1}^{K}(-1)^i h_i\left(\frac{1}{p+i-\theta} + \frac{1}{p-i-\theta}\right)\right)$$

where $\theta$ depends on the desired delay.
The value $\theta=0$ corresponds to the source filter.

$$h'_p = \frac{(-1)^{p+1}\sin(\pi\theta)}{\pi}\left(\frac{h_0}{p-\theta} + \sum_{i=1}^{K}(-1)^i h_i\left(\frac{1}{p+i-\theta} + \frac{1}{p-i-\theta}\right)\right)$$

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

The invention claimed is:
1. A system of estimating and tracking the frequency offset for a transmission system whose bandwidth is not insignificant with respect to the central frequency, the system transmitting a waveform including fixed carriers whose level is substantially greater than that of the carriers transporting the information, the carriers having frequencies $F_0 \ldots F_{N-1}$, and the payload signal carrying the information, comprising:
N banks of band-pass filters, each bank comprising P filters, suitable for covering all of the values that the frequencies $F_0 \ldots F_{N-1}$ may take after Doppler offset,
a filter output is connected to a quadratic envelope detector,
P adders suitable for adding the corresponding outputs of the N banks of filters,
a first system for detecting the position of the two largest maxima from the P sums and for validating the position of the larges maximum,
a second system for storing the positions of the two larges maxima and their weight and for predicting the current value,
a third system for validating/replacing the position found, and
a fourth system converting the positions into estimated Doppler and filtering the latter through a low pass filter.
2. A method to estimate and track the Doppler effect for a signal having a waveform including fixed carriers of a level substantially greater than the level of the carriers transporting the information, the carriers having frequencies $F_0 \ldots F_{N-1}$, and the payload signal carrying the information in a transmission system whose bandwidth is not insignificant with respect to the central frequency, comprising:
transmitting the composite signal comprising the useful signal carrying information and the reference signal to a filtering step using the frequencies of the carriers,
determining, for each filter, the envelope of the signal, $e_{n,p}$, adding the various outputs $e_{n,p}$, determining the values of the two largest maxima, M and m, for several moments, t, determining the probable value of the position at the moment t, considering the maxima found that define uniquely the associated Doppler offset value, and carrying out a low-pass filtering on the Doppler offset values in order to obtain a smoothed value.

3. The method as claimed in claim 2, comprising a step in which the smoothed value is interpolated at intermediate moments by means of low-pass filters derived from the filter of claim 2.

4. The method as claimed in claim 2, the filtering step comprising:

the input signal is windowed by a Hanning window (simple raised cosine) for a period of 160 ms, with overlap of 80 ms between two successive windows, to the 1.024 points obtained, 3.072 null points are added, then:

the 4096-point fast Fourier transform FFT is carried out on this signal whose output is marked $Z_0, Z_1 \ldots Z_{4095}$, for a desired central frequency $F_{n,p}$ the rank n of the bin $Z_n$ of the fast Fourier transform FFT that is just below is computed, the real number x lying between 0 and 1 which is $(F_{n,p} - 1.5625\ n)/1.5625$ is computed and two complex numbers z0(x) and z1(x) that are function of x are selected, and the filter output is determined by z0(x) Zn+z1(x) Zn+1.

5. The method as claimed in claim 2, wherein the value of the two maxima found is refined by quadratic regression.

6. The method as claimed in claim 2, wherein the step 6 of low-pass filter is carried out with a linear-phase low-pass filter with an odd number of coefficients.

* * * * *